United States Patent
Andrew et al.

(10) Patent No.: US 12,354,084 B2
(45) Date of Patent: Jul. 8, 2025

(54) OFFLINE COIN PROTOCOL

(71) Applicant: Mastercard International Incorporated, Purchase, NY (US)

(72) Inventors: Erick Andrew, New York, NY (US); Issidor Iliev, White Plains, NY (US); Naveen Garg, Chappaqua, NY (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 240 days.

(21) Appl. No.: 18/124,265

(22) Filed: Mar. 21, 2023

(65) Prior Publication Data
US 2023/0230071 A1 Jul. 20, 2023

Related U.S. Application Data

(63) Continuation of application No. 17/453,579, filed on Nov. 4, 2021, now Pat. No. 11,636,466.
(Continued)

(51) Int. Cl.
G06Q 20/36 (2012.01)
G06Q 20/40 (2012.01)

(52) U.S. Cl.
CPC ..... G06Q 20/3674 (2013.01); G06Q 20/3678 (2013.01); G06Q 20/4012 (2013.01)

(58) Field of Classification Search
CPC ........... G06Q 20/3674; G06Q 20/3678; G06Q 20/4012; G06Q 20/382; G06Q 20/3823;
(Continued)

(56) References Cited

U.S. PATENT DOCUMENTS 5,623,547 A 4/1997 Jones et al.
6,299,062 B1 * 10/2001 Hwang ................ H04L 9/3271
235/379
(Continued)

FOREIGN PATENT DOCUMENTS

EP 0421808 B1 4/1991
WO 2012/123394 A1 9/2012

OTHER PUBLICATIONS

European Search Report dated Apr. 17, 2024 which was issued in connection with European Patent No. 21892586.5.
(Continued)

*Primary Examiner* — Eric T Wong
(74) *Attorney, Agent, or Firm* — Buckley, Maschoff & Talwalkar LLC (57) ABSTRACT

Methods, apparatus and systems for verifying coin ownership are disclosed. In an embodiment, a coin service provider identifies an online session initiated by a wallet application and a next coin to verify, receives information associated with the next coin from a wallet application, determines that ownership of the next coin was transferred out of the wallet application since the last time coins in the wallet application were verified and that ownership of the next coin has not been updated in a coin data store. The coin service provider then transmits a prompt to the user device for the user to confirm that a transaction involving the next coin completed successfully, receives a confirmation message from the user device, confirms that the next coin was received by a recipient, and next updates ownership information of the next coin in the coin data store.

16 Claims, 8 Drawing Sheets

Related U.S. Application Data (60) Provisional application No. 63/114,210, filed on Nov. 16, 2020.

(58) Field of Classification Search
CPC ........... G06Q 20/3827; G06Q 20/3829; G06Q 20/36; H04L 2209/56; H04L 9/50
See application file for complete search history.

(56) References Cited

U.S. PATENT DOCUMENTS

| | | | |
|---|---|---|---|
| 6,439,455 | B1 | 8/2002 | Everett et al. |
| 7,233,926 | B2 | 6/2007 | Durand et al. |
| 11,403,627 | B2* | 8/2022 | Kikinis ............... H04L 9/0894 |
| 11,915,232 | B2* | 2/2024 | Rodrigues .......... G06Q 20/3278 |
| 2013/0062420 | A1 | 3/2013 | Hamman et al. |
| 2015/0046337 | A1* | 2/2015 | Hu ....................... G06Q 20/36 705/41 |
| 2015/0128254 | A1 | 5/2015 | Rao et al. |
| 2015/0365283 | A1 | 12/2015 | Ronca et al. |
| 2016/0117671 | A1* | 4/2016 | Kalinin .............. G06Q 20/4016 705/41 |
| 2016/0180338 | A1* | 6/2016 | Androulaki .......... H04L 9/3228 705/71 |
| 2016/0364701 | A1* | 12/2016 | Nayfack ............. G06Q 20/202 |
| 2017/0053249 | A1* | 2/2017 | Tunnell .................. G09C 5/00 |
| 2017/0169403 | A1* | 6/2017 | Zhang ................ G06Q 20/065 |
| 2017/0236121 | A1* | 8/2017 | Lyons .................. G06Q 20/06 705/71 |
| 2019/0052467 | A1 | 2/2019 | Bettger |
| 2019/0295068 | A1 | 9/2019 | Macquilken |
| 2020/0057706 | A1* | 2/2020 | Rome ................. H04L 63/1425 |
| 2020/0294034 | A1 | 9/2020 | Kikinis et al. |
| 2020/0351089 | A1 | 11/2020 | Wentz |
| 2021/0398104 | A1* | 12/2021 | Yan .................... G06Q 20/4037 |
| 2022/0051240 | A1* | 2/2022 | Shamai ............... G06Q 20/405 |
| 2023/0344649 | A1* | 10/2023 | Zamani ............. G06Q 20/3227 |

OTHER PUBLICATIONS

O'Mahony D et al: "Electronic Payment Systems, Electronic Cash Payment Systems", Jan. 1, 1997 (Jan. 1, 1997), Electronic Payment Systems; [Artech House Computer Science Library], Boston, MA : Artech House, US, pp. 1-45, XP002221626, ISBN: 978-0-89006-925-7.

Anonymous: "Out-of-band—Wikipedia", Oct. 20, 2019 (Oct. 20, 2019), pp. 1-2, XP093144077, Retrieved from the Internet: URL:https://en.wikipedia.org/w/index.php?title=Out-of-band&oldid=922228242 [retrieved on Mar. 21, 2024].

Information Disclosure Statement dated Nov. 4, 2021 which was filed in U.S. Appl. No. 17/453,579.

Information Disclosure Statement dated Feb. 28, 2022 which was filed in U.S. Appl. No. 17/453,579.

International Search Report and Written Opinion dated Feb. 24, 2022 which was issued in connection with International Application No. PCT/US21/057718; 4 pages.

892 Form dated Jun. 27, 2022 which was received in connection with U.S. Appl. No. 17/453,579.

892 Form dated Jan. 5, 2023 which was received in connection with U.S. Appl. No. 17/453,579.

Notice of Allowance dated Jan. 5, 2023 which was received in connection with U.S. Appl. No. 17/453,579.

* cited by examiner

OFFLINE COIN PROTOCOL

CROSS REFERENCE TO RELATED APPLICATION

This application is a U.S. Continuation Application of U.S. patent application Ser. No. 17/453,579 filed on Nov. 4, 2021, which claims the benefit of U.S. Provisional Patent Application No. 63/114,210 which was filed on Nov. 16, 2020, the contents of which Applications are hereby incorporated by reference for all purposes.

BACKGROUND

Currently, the acceptance of most forms of electronic payment requires a live Internet connection. In many parts of the world, maintaining a live Internet connection all day every day is expensive for merchants and requires both access to a reliable Internet service provider, payment of Internet subscription fees, as well as potentially expensive equipment to maintain such a connection. Reliable Internet connections are unavailable in other situations as well, such as underground or remote locations or situations where a large number of users may overwhelm the network or where a natural disaster prevents access.

It would be desirable to provide systems and methods for conducting secure and reliable financial transactions in an offline environment.

SUMMARY OF THE INVENTION

According to some embodiments, systems, methods, apparatus, computer program code and means are provided to operate a first device to receive a coin having value from a second device while offline. In some embodiments, a method is provided that includes receiving, over a local communication channel, information to confirm the validity of the second device, receiving, over the local communication channel, a coin transfer message from the second device, the coin transfer message including coin information, receiving, over a channel other than the local communication channel, a passcode from a user of the second device, verifying information in the coin transfer message using the passcode, and generating a hash of the coin information using a PIN associated with the first device.

Pursuant to some embodiments, the information to confirm the validity of the second device includes a hash of application executable code of a wallet application of the second device. In some embodiments, the validity is confirmed if the first device can validate the hash of application executable code by generating the same hash using application executable code of a wallet application of the first device. In some embodiments, the generating the same hash includes generating the hash using the current date as the key input to a hashing algorithm.

Pursuant to some embodiments, the method includes receiving, over the local communication channel, a private key associated with the second device and the coin transfer message is encrypted by a public key associated with the second device, and the method further includes decrypting the coin transfer message using the private key associated with the second device to obtain the coin information. In some embodiments, the sender or the recipient can perform a coin verification process using the coin information and a key. In some embodiments, the coin verification process includes verifying a hash value in the coin transfer message by regenerating the hash value using a coin serial number. In some embodiments, the method includes initiating an online connection with a coin service provider to update ownership information associated with the coin.

Some technical effects of some embodiments of the invention are improved and computerized ways to securely transfer value between users even when no internet or online access is available. With these and other advantages and features that will become hereinafter apparent, a more complete understanding of the nature of the invention can be obtained by referring to the following detailed description and to the drawings appended hereto.

DETAILED DESCRIPTION

The present invention provides significant technical improvements to interactions requiring the transfer of coins having value between two entities operating computing devices. Pursuant to some embodiments, value may be transferred even in situations where the computing devices are "off-line" (or are otherwise unable to communicate with a central issuing authority or payment network). The present invention is directed to more than merely a computer implementation of a routine or conventional activity previously known in the industry as it significantly advances the technical efficiency, access and/or accuracy of interactions between devices by implementing a specific new method and system as defined herein. The present invention is a specific advancement in the area of peer to peer transfer and provides benefits in security, privacy and the ability to easily validate participants in the peer to peer transfer even in situations where the participants are unable to communicate with a network or other authority.

As used herein, the term "digital wallet" refers to an application installed on a user device that allows a user to participate in coin transactions with other digital wallets configured pursuant to the present invention. Each digital wallet may store some indication of an amount (or balance) of "value" contained within the digital wallet. The value may be, for example, an amount of coins as well as other value (such as a currency value) or the like.

Figure 1:
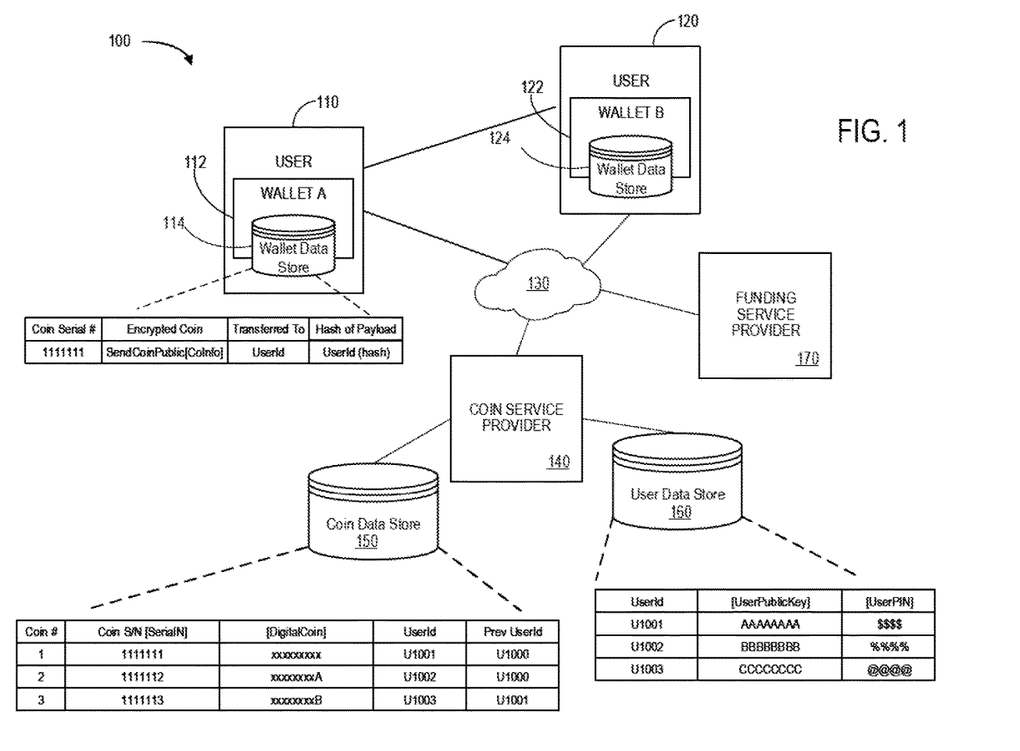
FIG. 1 is a high-level block diagram of a system according to some embodiments.

FIG. 1 is a high-level block diagram of a system 100 according to some embodiments of the present invention. As shown, the system 100 includes several entities that may be involved in offline coin transactions of different types pursuant to embodiments of the present invention. For example, the system 100 may include one or more users operating user devices 110, 120, one or more coin service providers 140 and one or more funding service providers 170. Depending on the nature of a transaction, one or more of the entities may interact with other entities via a network 130. However, in some embodiments, interactions between user devices 110, 120 may typically include offline interactions (e.g., where one user device interacts with another via a local connection such as Bluetooth, Bluetooth LE, near field communications (NFC), infrared (IR), WiFi, or the like). One or more of the user devices 110, 120 may be, for example, mobile devices such as smart phones or the like. User devices 110, 120 may also be smart watches, fitness trackers, or other devices that may operate to store and transfer coins securely as described herein.

As will be described further herein, only certain transactions involve the coin service provider 140 and the funding service provider 170 (transactions such as the registration process of FIG. 2, the coin purchase process of FIG. 3, the coin verification process of FIG. 4 or the verification process of FIG. 7), while transactions involving the transfer of coins between users typically only involve the user devices 110, 120. That is, pursuant to some embodiments, users operating user devices 110, 120 may exchange value in offline environments, without involvement of online devices (such as coin service providers 140 or the like). In this manner, embodiments allow users to securely and reliably exchange value even in situations where no Internet or other connectivity is available.

As shown in FIG. 1 (and as will be described in further detail below), a coin service provider 140 maintains a repository or database(s) containing all coins created and in circulation (shown as coin data store 150). The coin data store 150 contains detailed information about the status of each coin (where each coin is associated with a coin serial number "SerialN"). The status information associated with each coin may include, for example, the number of each coin (which may be, for example, a numeric that simply increments each time the coin service provider 140 issues a new coin), a coin serial number "SerialN", a digital representation of the coin ("DigitalCoin"), information identifying the user that currently owns the coin ("UserID") as well as information identifying the user that previously owned the coin ("Prev UserID").

The user information (including UserID and Prev UserID) may, for example, be or include a pointer or reference to data in a user data store 160 which stores information identifying users participating in the system of the present invention. In some embodiments, the user data store 160 stores information about users who have registered to participate in the system of the present invention (e.g., to acquire, transfer, and redeem coins). A registration process pursuant to some embodiments will be discussed below in conjunction with FIG. 2. In general, information stored or associated with the user data store 160 includes information identifying each user as well as a public key associated with the user ("UserPublicKey") and a code or personal identification number selected by the user during registration ("UserPIN"). The UserPublicKey is used to encrypt a coin payload for transmission and the UserPIN is used to verify the coin was transferred to the recipient. Further details of transactions using the data from the coin data store 150 and the user data store 160 will be provided below.

In some embodiments, to purchase a coin issued pursuant to the present invention, a user may be required to purchase the coin using a fiat currency (such as U.S. Dollars or the like). In order to make such a purchase, one or more funding service providers 170 may be used to facilitate the purchase transaction. Similarly, in some embodiments, to convert a coin into a fiat currency (such as U.S. Dollars or the like), one or more funding service providers 170 may be used to facilitate the transaction.

Prior to conducting a transaction, each of the users may enroll their respective user devices 110, 120 to participate in the coin system of the present invention by downloading a wallet application 112, 122 onto their user device 110, 120 and performing a registration process (such as the one described below in conjunction with FIG. 2). Each wallet application 112, 122 may be configured with one or more cryptographic algorithms and related data in order to conduct transactions pursuant to the present invention as will be described further herein. In some embodiments, each wallet application 112, 122 is also configured with a public key cryptography system that allows each participating wallet application 112, 122 to exchange information with other participants in the system 100 using a standard public/private key encryption mechanism.

Pursuant to some embodiments, the coin service provider 140 may be a payment network service provider such as, for example, Mastercard International Incorporated (referred to herein as "Mastercard"). The funding service provider 170 may be a financial institution that is able to interact with wallet applications 112, 122 of the present invention (e.g., by confirming the validity of coins in a wallet as described herein) and is able to conduct value transfers with those wallet applications (or with other accounts of the users). Interactions with a funding service provider 170 may result in value being exchanged into (or from) a fiat currency or other tangible forms of value. For example, a coin (or group of coins) having a value of $10 of value that are stored in wallet 112 of user device 110 may be converted into $10 by interacting with a funding service provider 170. Funds may be transferred to (or from) credit cards, bank accounts, or other sources of value such as PayPal or the like. In some embodiments, the coin service provider 140 and the funding service provider 170 may be or may be operated by or on behalf of the same entity.

In some embodiments, the coin service provider 140 serves as a central institution to create and convert coins in the system 100. In some embodiments, a public/private key infrastructure is used as a framework for issuing, transmitting and validating coins. For example, in some embodiments, the coin service provider 140 has two sets of public and private keys—one pair referred to as "SendCoin" (and including "SendCoinPublic" and "SendCoinPrivate") and the other pair referred to as "ReceiveCoin" (and including "ReceiveCoinPublic" and "ReceiveCoinPrivate"). The SendCoin key pair is used to encrypt coins when a user acquires the coins from the coin service provider 140. The SendCoinPublic key is used by the coin service provider 140 to encrypt a coin payload and the SendCoinPrivate key is then used by a wallet application 112, 122 to decrypt the coin payload when received by a user device 110, 120.

The ReceiveCoin key pair is used to encrypt coins for transmission back to the coin service provider 140. For example, the ReceiveCoinPublic key (which is stored in each wallet application 112, 122) is used to encrypt a coin payload for transmission from a user device 110, 120 to the coin service provider 140 (e.g., when the user wishes to redeem coin(s) for a fiat currency). The coin service provider 140 uses the ReceiveCoinPrivate key to decrypt the coin payload. Further details of this public key infrastructure and how it is used in different transactions and scenarios will be described further below.

Pursuant to some embodiments, the user devices 110, 120 may be portable devices that can be transported and be operated by a user, and may include one or more electronic components (e.g., an integrated chip, etc.). A user device according to some embodiments may be in any suitable form including, but not limited to a mobile phone (e.g., smart phone, cellular phone, etc.), a tablet computer, a portable media player, a personal digital assistant device (PDA), a wearable communication device (e.g., watch, bracelet, glasses, etc.), an electronic reader device, a laptop, a netbook, an ultrabook, etc. A user device may also be in embodied in other form factors (such as, for example, a component in a vehicle equipped with communication capabilities).

Some or all of the processing described herein may be performed automatically or otherwise be automated by one or more computing devices or systems. As used herein, the term "automate" may refer to, for example, actions that can be performed with little (or no) intervention by a human. While only two user devices 110, 120 are shown in FIG. 1, in practical application, a large number of user devices would interact with each other and with one or more coin service providers 140 and funding service providers 170.

Further details of some embodiments will now be described by reference to FIG. 2 where a registration process 200 is shown from the perspective of a user device such as user device 110). Registration process 200 begins at 202 where a user interacts with a user device 110 to install a wallet application 112 pursuant to the present invention. For example, the user may direct a browser of the user device 110 to an application download page hosted by or on behalf of a coin service provider 140. The application will be generally referred to herein as a wallet application (such as the wallet application 112 of user device 110) and may provide functionality to allow a user to purchase, store and transfer coins pursuant to the present invention. While the application may contain a wallet to store coins to be used to purchase or transfer to other users, it may contain additional functionality as well.

When the application has been downloaded or otherwise installed on the user device 110, processing continues at 204 where the user is prompted to create a public/private key pair which will be used to encrypt or decrypt any payload associated with the transfer of coins into or out of the wallet application 112. Creation of the public/private key pair may be performed by simply prompting the user to select a menu option or button to generate the keys (which may cause the application to use information about the user device and time to generate the keys and store them in the wallet application). Processing at 204 may also include communicating the details of the UserID as well as the generated UserPublicKey to the coin service provider 140 for storage in the user data store 160.

Processing continues at 206 where the user is prompted to select a UserPIN that will be associated with the user's UserID to verify any transfer of coins from the user to other users. Processing at 206 may also include communicating the UserPIN to the coin service provider 140 for storage in the user data store 160. In some embodiments, the UserPIN may be generated on behalf of the user. At the end of the registration process 200, the user has a user device 110 configured with a wallet application 112 that can purchase, store and transfer coins pursuant to the present invention.

Once a user device 110, 120 has been configured with a wallet application 112, 122 and the user has performed a registration process (such as the one described in FIG. 2), the user may use the user device 110, 120 to conduct transactions pursuant to the present invention. A user may choose to conduct a coin purchase transaction process such as the process 300 shown in FIG. 3 in order to acquire one or more coins that may then be used to conduct coin purchase transactions. Process 300 begins at 302 where a user (such as a user of device 110) interacts with a coin service provider 140 to initiate a coin purchase from the coin service provider 140. For simplicity and ease of exposition, the process 300 will be described using an example where a user purchases a single coin—those skilled in the art, upon reading the present disclosure, will recognize that the process may be extended to purchases involving multiple coins.

Figure 3:
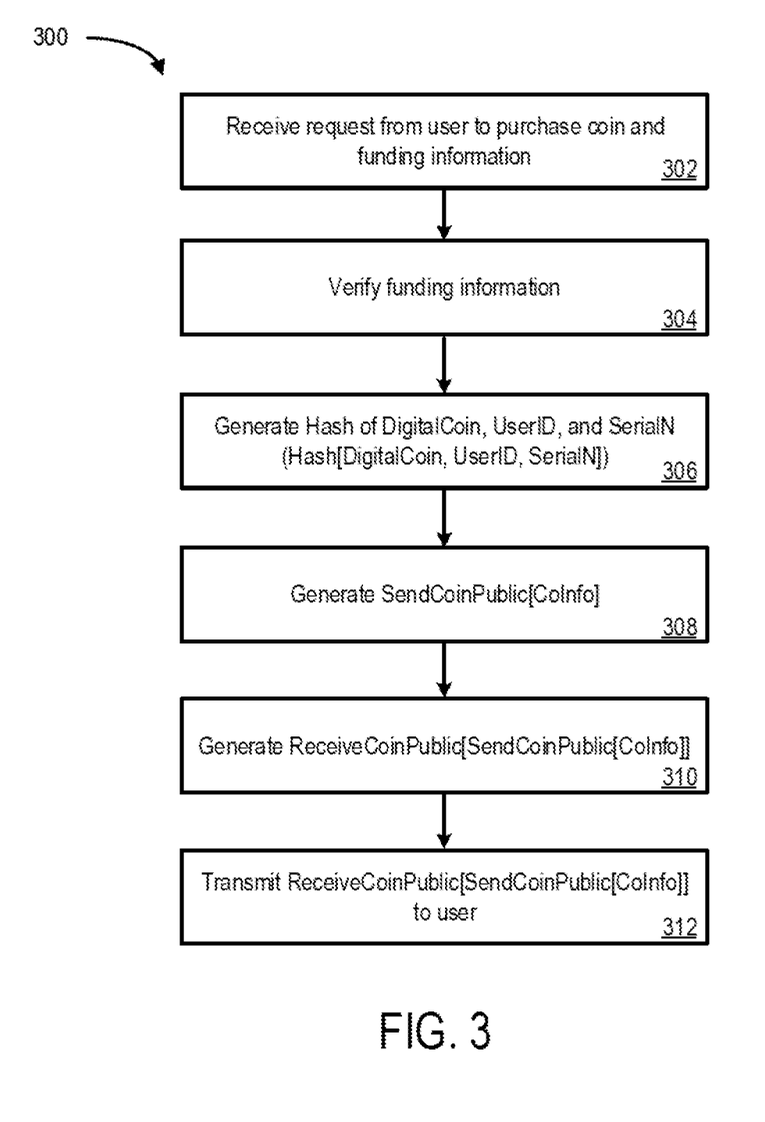
FIG. 3 is a flow diagram of a coin purchase transaction process according to some embodiments.

The interaction at 302 may include the user device 110 and the wallet application 112 being operated to initiate a request to purchase a coin as well as to provide funding information. In some embodiments, the funding information may be payment card or payment account information. The request may be performed in a typical shopping cart type of a transaction (e.g., where the user interacts with a shopping cart to select a quantity of coin(s) as well as to provide payment information). In some embodiments, the funding transaction may be performed using or in conjunction with a funding service provider 170. Processing continues at 304 where the funding information is verified and, if verified, processing continues at 306 where the coin service provider 140 performs processing to issue the coin that have been purchased.

Processing continues at 306 where the coin service provider 140 creates a hash of DigitalCoin (the digital representation of the purchased coin) and UserID (the UserID of the user purchasing the coin) using the SerialN (the serial number of the purchased coin) using a hashing algorithm that is supported and used by all devices on in the system 100 (e.g., SHA-256 or the like). The resulting hash is referenced as Hash[DigitalCoin, UserID, SerialN] or HASH. Processing continues at 308 where the coin information ("CoInfo") is encrypted using the coin service provider 150 public key (that is, SendCoinPublic[CoInfo] is generated). The CoInfo (or the coin payload) is the HASH+UserID+DigitalCoin+SerialN. At this point, the coin payload ("CoInfo") has been encrypted by the SendCoin public key and can only be decrypted by the SendCoin private key which has been distributed to wallet applications 112, 122. The purpose of this encryption is to allow any user having wallet applications 112, 122 to use the application to verify the validity of the coin (as described below in conjunction with FIG. 4).

Processing continues at 310 where the coin service provider 140 encrypts the encrypted coin payload SendCoinPublic[CoInfo] with the public key of the user who purchased the coin. The resulting payload can be represented as ReceiveCoinPublic[SendCoinPublic[CoInfo]]. At this point, only the user who purchased the coin can decrypt and utilize the coin using the user's ReceiveCoinPrivate key. Processing continues at 312 where the encrypted payload ReceiveCoinPublic[SendCoinPublic[CoInfo]] is transmitted to the user's wallet application 112. At the end of process 300, a user (such as the user operating user device 110 of FIG. 1) may have information as shown in FIG. 1 in the user's wallet application 112 (including a coin having a serial number, encrypted coin information, and hash of the payload). The user may now interact with other users in the system to transfer the coin in offline coin transactions pursuant to the present invention.

Prior to a discussion of how offline coin transactions between users are conducted, reference will first be made to FIG. 4 where a process 400 for verifying the validity of a coin will be described. The process 400 may be performed at any time that a user or participate in the system 100 wishes to verify the validity of a coin. For example, the user of user device 110 may wish to verify the validity of coin serial number 111111 (which is shown as a coin in the user's wallet application 112 in FIG. 1). The verification process 400 begins at 402 where the user initiates a coin verification process by, for example, selecting a coin verification option available in the wallet application 112. Processing continues at 404 where the wallet application functions to decrypt the encrypted coin (by decrypting SendCoinPublic[CoInfo] from the received payload ReceiveCoinPublic[SendCoin-Public[CoInfo]] by using user's ReceiveCoinPrivate key) to obtain SendCoinPublic[CoInfo]. Processing at 404 may further include processing where the wallet application functions to decrypt the encrypted coin (by decrypting SendCoinPublic[CoInfo] using SendCoin private key which is available in the wallet application to obtain the clear text Hash[DigitalCoin, UserID, SerialN], DigitalCoin, UserID, and SerialN (where Hash[DigitalCoin, UserID, SerialN] is referred to herein as the stored hash). Processing continues at 406 where a hash is created (the "created hash") using DigitalCoin, UserID and SerialN (using the serial number and using a hashing algorithm that is supported and used by all devices in the system 100 such as, for example SHA-256 or the like). At 408 a determination is made whether the created hash is equal to the stored hash. If so, the coin has been verified and processing continues at 412 and the user is informed of the success—that the coin was verified. If not, the coin has not been verified and processing continues at 410 and the user is informed of the failure—that the coin was not verified. In such a situation, the user may be able to decline a transaction or otherwise refused to accept the coin as described elsewhere herein.

Figure 5:
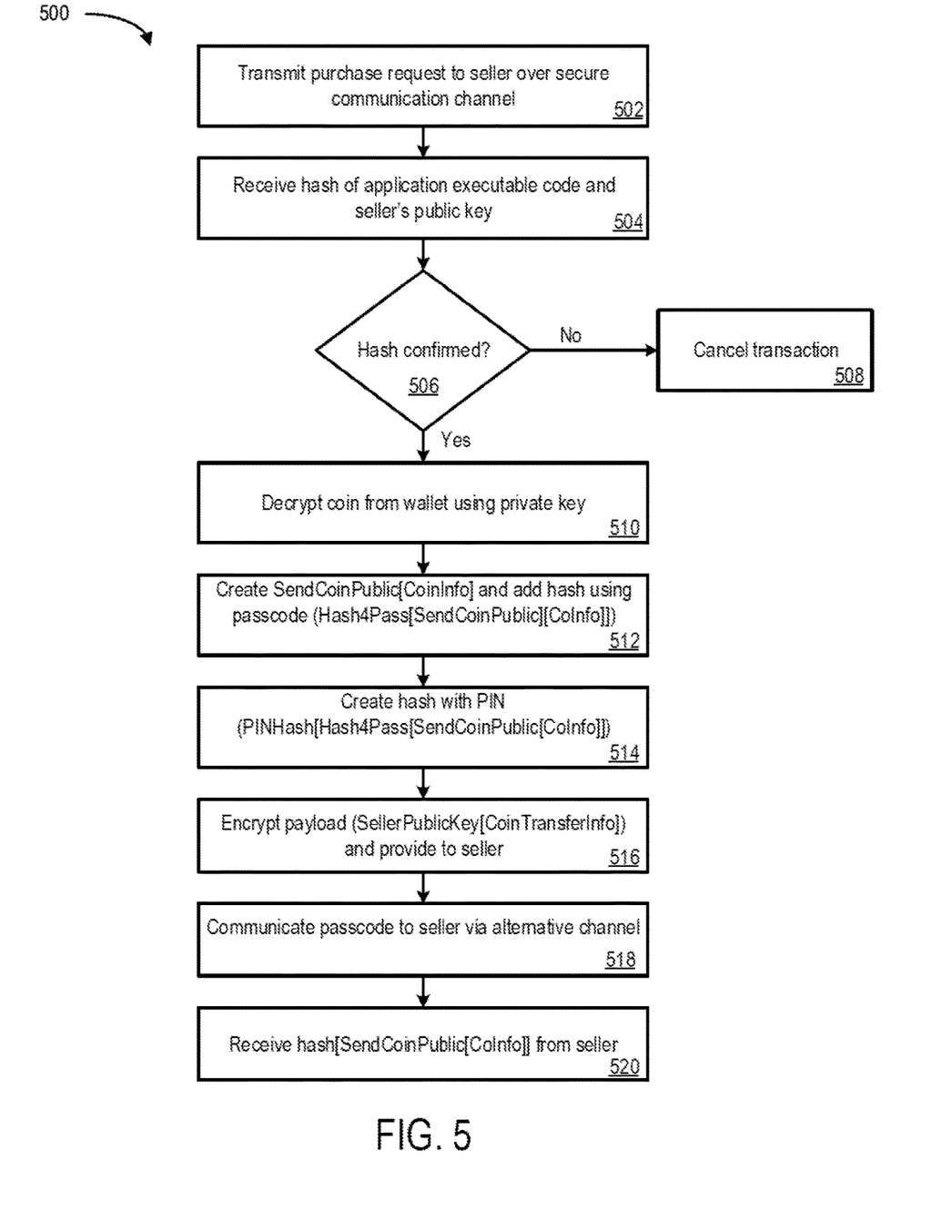
FIG. 5 is a flow diagram of a coin transaction process according to some embodiments.

Reference is now made to FIG. 5, where an offline coin transaction process 500 pursuant to some embodiments is shown. The process 500 is from the perspective of the buyer (the user operating a user device 110 in FIG. 1). The seller side of the process will be described in conjunction with FIG. 6.

Figure 2:
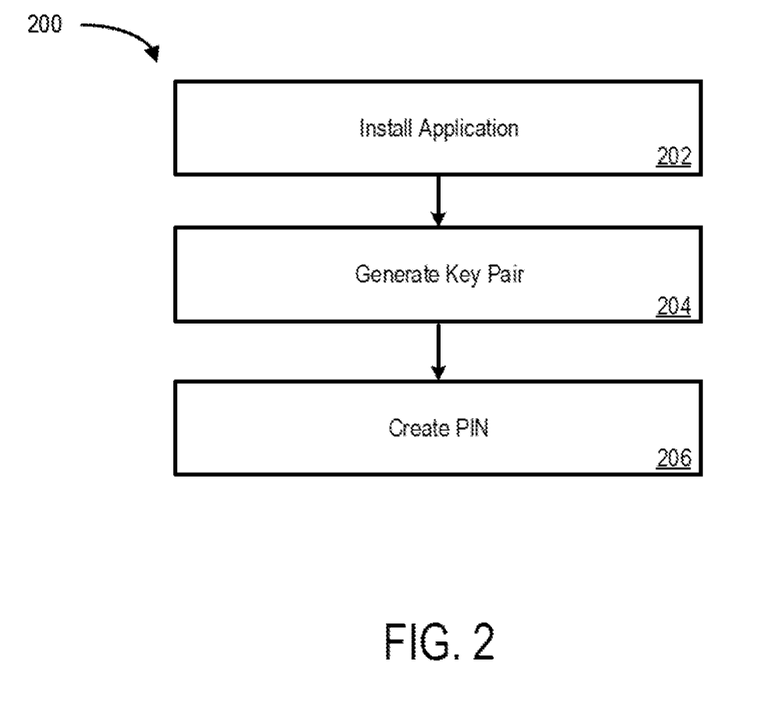
FIG. 2 is a flow diagram depicting a registration process according to some embodiments.

In general, before an offline coin transaction can occur between two users, both users must have registered to participate in the system of the present invention (e.g., each user must have performed a registration process such as that shown in FIG. 2 and each user must have a wallet application 112, 122). Further, each user must have a public/private key pair. Transaction process 500 begins at 502 where a buyer (such as the user operating user device 110 of FIG. 1) transmits a purchase request to a seller (such as the user operating user device 120 of FIG. 1) over a secure communication channel. As discussed above, the communication between user devices need not be "online" (e.g., it may not need the Internet). Instead, the communication between the devices may be over a local communication channel such as NFC, Bluetooth, or the like.

Once the connection has been established, the seller user device 120 transmits a hash of the wallet application 122 executable code and the seller's public key to the buyer user device 110. In some embodiments, the hash of the executable code uses the current date as the key input to the hashing algorithm. Since the wallet application 122 of the seller user device 120 is the same as the wallet application 112 of the buyer user device 110, the buyer should be able to generate a hash of wallet application 112 executable code (again using the current date as they key input to the hashing algorithm) and get the same hash value as the hash value provided by the seller. If the hash values don't match, processing continues at 508 and the transaction is canceled.

If the hash values do match, processing continues at 510 where the buyer (the user operating user device 110 of FIG. 1) decrypts a coin from the wallet application 112 using the buyer user's privatekey. At this point, the coin payload only has the encryption performed by the coin service provider 140 (or, SendCoinPublic[CoInfo]) and the payload can be prepared for transmission to the seller.

Processing continues at 512 where the buyer user operates the wallet application 112 of the user device 110 to generate a hash (Hash4Pass[SendCoinPublic[CoInfo]]) by adding a hash to the payload from 510 using a passcode (such as a four-digit passcode in this example). The payload is now the buyer's UserID, the seller's UserID, the location, the time, SendCoinPublic[CoInfo] and Hash4Pass[SendCoinPublic[CoInfo]].

Processing continues at 514 where the buyer user operates the wallet application 112 of the user device 110 to generate another hash using the buyer's PIN (BuyerPIN) which is stored in the coin service provider 140 user data store 160. The payload is now the buyer's UserID, the seller's UserID, the location, the time, SendCoinPublic[CoInfo], Hash4Pass[SendCoinPublic[CoInfo]] and BuyerPINHash[Hash4Pass[SendCoinPublic][CoInfo]].

Processing continues at 516 where the payload is encrypted with the seller public key (which was received at 504). This effectively transfers ownership of the coin to the seller (the user operating user device 120 in the illustrative example presented herein that refers to FIG. 1). At this point, the buyer (the previous owner of the coin and the operator of user device 110) can't use the coin anymore or transfer it to a different person as the coin has been encrypted using the seller public key. The seller is the only user that has access to decrypt the payload and all the information it contains. The encrypted information may be represented as SellerPublicKey[CoinTransferInfo]. This information is provided to the seller via the secure communication channel established between devices 110 and 120.

At this point, the seller uses the seller private key to decrypt the payload in SellerPublicKey[CoinTransferInfo] to produce the following data: Buyer UserID, Seller UserID, location, time, SendCoinPublic[CoInfo], Hash4Pass[SendCoinPublic[CoInfo]] and BuyerPINHash[Hash4Pass[SendCoinPublic[CoInfo]]]. The seller now has to verify the coin is valid (e.g., using the process 400 of FIG. 4). If the coin is not authenticated, the process terminates and the seller does not complete the transaction. If the coin is authenticated, the seller needs to get the buyer's passcode (e.g., such as the 4 digit passcode used in step 512).

Processing continues at 518 where the buyer (the user operating user device 110) communicates the buyer's passcode to the seller (the user operating device 120) via different channel (e.g., such as via an SMS message, an email or by voice). The purpose of the passcode is to provide finality of the transaction to both parties. Once the buyer provides the passcode to the seller, the seller can verify the hash Hash4Pass[SendCoinPublic[CoInfo]]. If the verification is successful, the seller can now provide the goods or services to the buyer. Otherwise, if the verification is not successful, although the seller has possession of the coin, it is worthless since the coin service provider 140 will not recognize the transfer of ownership (as described further below in conjunction with FIG. 7) and the wallet application 122 cancels the transaction. If, however, the seller is able to verify the coin, the seller creates a hash of SendCoinPublic [CoInfo] with the seller's private PIN (which is stored in the coin service provider 140 user data store 160). The hash is transmitted back to the buyer where it is received at 520. The buyer stores the hash in the wallet application 112 in the wallet data store 114 for later use in verifying that the coin was actually received by the seller. Once the coin is validated, the coin will remain in the seller's wallet application 122 until he is ready to redeem it with the coin service provider 140 or otherwise convey it. In some embodiments, the seller has up to 30 days to go online and connect the wallet application 122 with the coin service provider 140 to notify the service provider of the seller's ownership of the coin. Otherwise, the seller risks the possibility of the buyer contesting the ownership of the coin.

Figure 6:
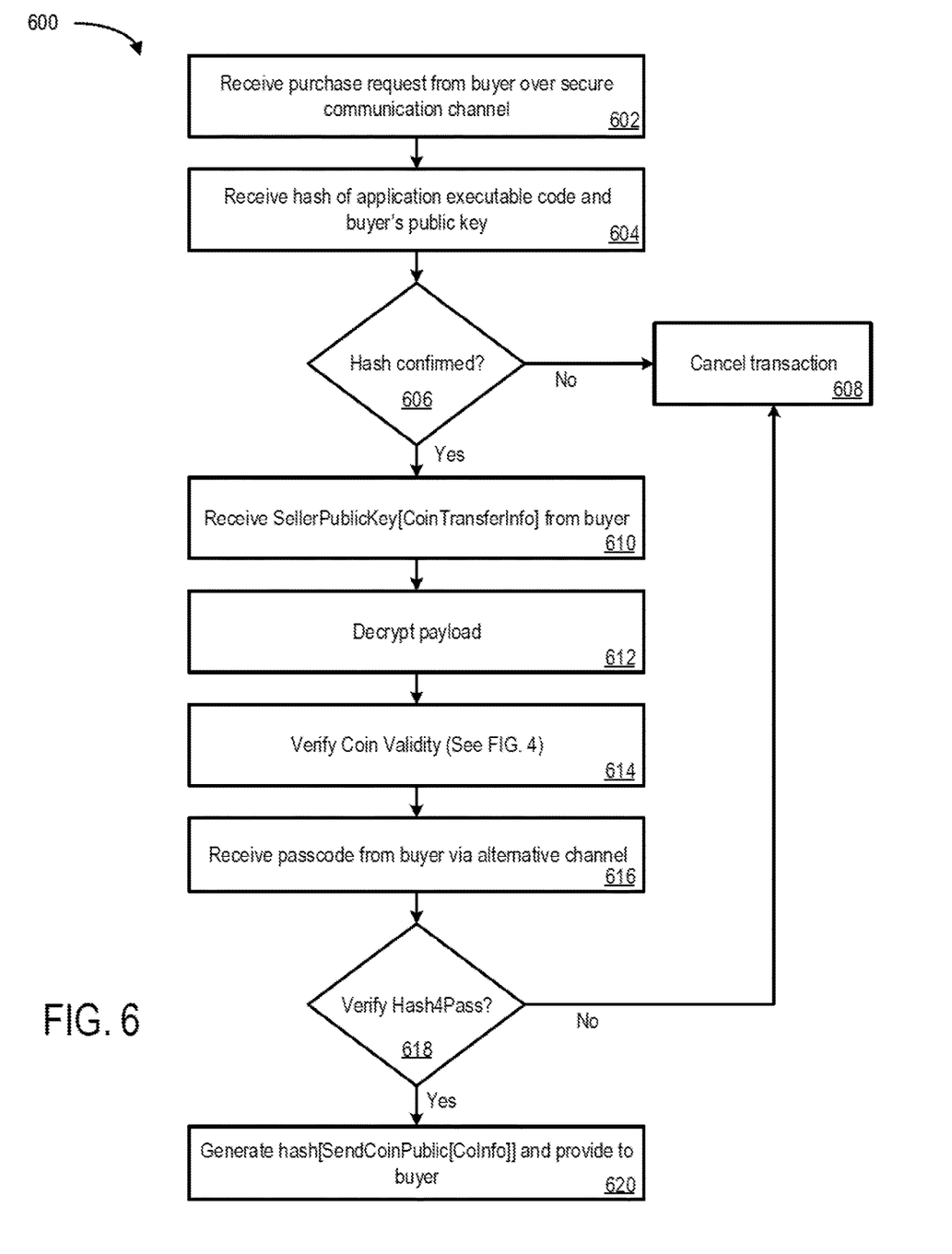
FIG. 6 is a flow diagram of a coin transaction process according to some embodiments.

Reference is now made to FIG. 6 where a transaction process 600 is shown. The transaction process 600 is from the perspective of the seller in the illustrative transaction discussed above (e.g., where the seller is a user operating user device 120). The process 600 begins at 602 where the wallet application 122 of the seller's user device 120 receives a purchase request from a buyer over a secure communication channel (e.g., as discussed in conjunction with 502 of FIG. 5). The seller wallet application 122 may respond by providing a hash of the wallet application executable code and the seller's public key. Processing continues at 604 where the wallet application 122 receives a hash of the application executable code and the buyer's public key from the buyer wallet application 112. Processing at 604 may be performed as at 504 to confirm the hash. If the hash is not confirmed the seller wallet application 122 may cancel the transaction at 608.

If the hash is confirmed, processing continues at 610 where the seller wallet application 122 receives the payload with SellerPublicKey[CoinTransferInfo] from the buyer wallet application 112. At 612, the seller wallet application 122 acts to decrypt the payload using the seller private key to obtain Buyer UserID, Seller UserID, location, time, SendCoinPublic[CoInfo], Hash4Pass[SendCoinPublic[CoInfo]], and BuyerPINHash[Hash4Pass[SendCoinPublic[CoInfo]]]. Processing continues at 614 where the seller wallet application 122 operates to verify the coin validity (using the process 400 of FIG. 4). If the process is unable to verify the validity of the coin, processing continues at 608 where the wallet application 122 cancels the transaction.

If the process is able to verify the validity of the coin, processing continues at 610 where the seller obtains the passcode from the buyer (as described in 518 above). The passcode is used by the wallet application 122 to verify Hash4Pass (as described above). If the hash is not able to be verified, the wallet application 122 cancels the transaction. If the hash is verified, processing continues at 620 where the wallet application 122 generates a hash of SendCoinPublic[CoInfo] with the seller private PIN (which is stored in the coin service provider 140 user data store 160) and communicates the hash back to the buyer device 110. As discussed above, the coin now remains in the seller's wallet application 122, and the seller has up to (for example) 30 days to notify the coin service provider 140 of the seller's ownership of the coin.

Figure 4:
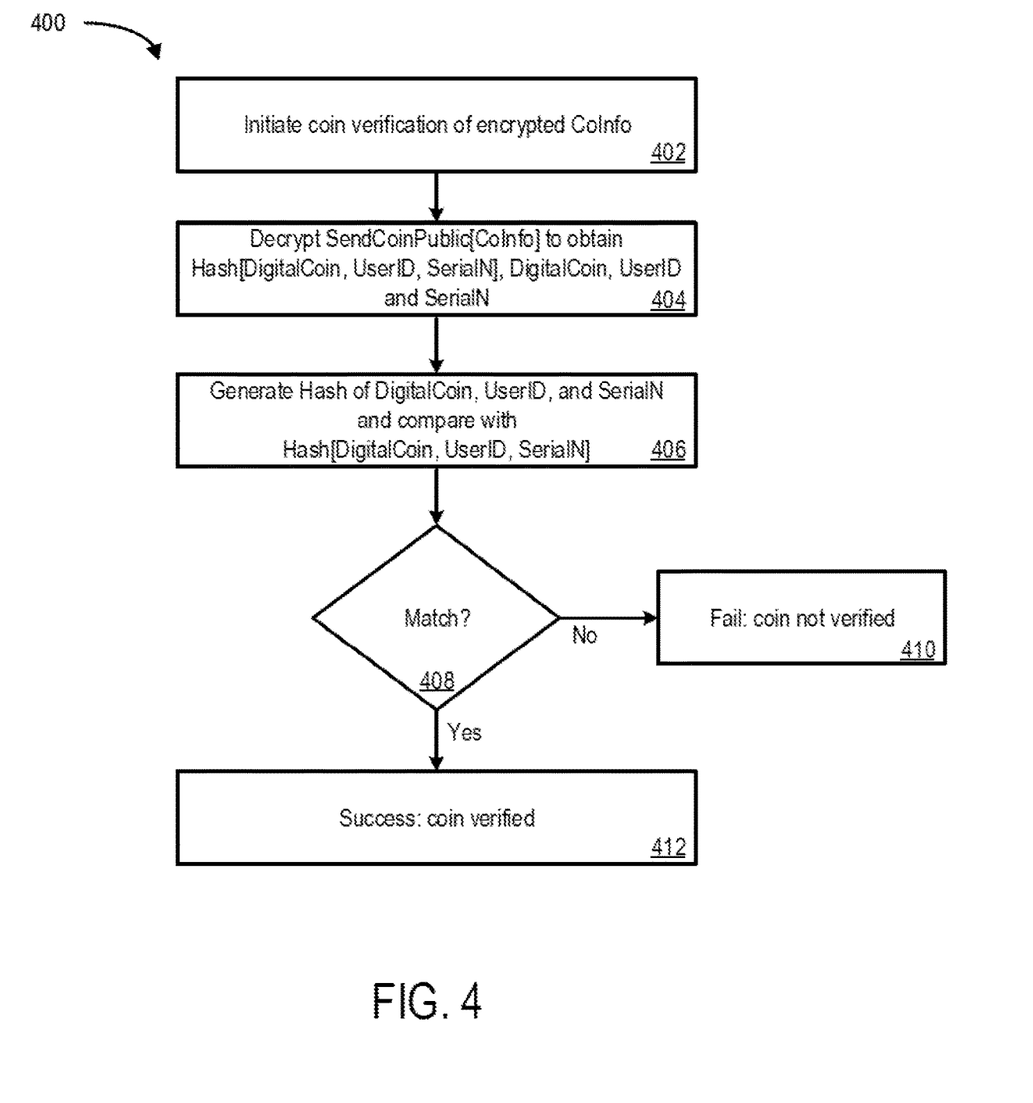
FIG. 4 is a flow diagram of a coin verification process according to some embodiments.

The processing of FIGS. 4-6 may be performed in an offline environment (e.g., where there is no Internet or cellular data connectivity). In some embodiments, the user devices 110, 120 are required to confirm the status of coins by going in an online mode from time to time (for example, at least once every 30 days, etc.). A process for verifying ownership 700 will now be described by reference to FIG. 7. The process 700 is generally described from the perspective of a coin service provider 140 when the coin service provider 140 is in communication with a wallet application 112, 122. Pursuant to some embodiments, wallet applications 112, 122 are configured to automatically initiate the performance of a verification process 700 when the wallet applications 112, 122 detect that the user device 110, 120 is in communication with the Internet or is otherwise able to communicate with coin service provider 140. For simplicity, the process 700 will be described by reference to the wallet application 112 associated with the user device 110.

Figure 7:
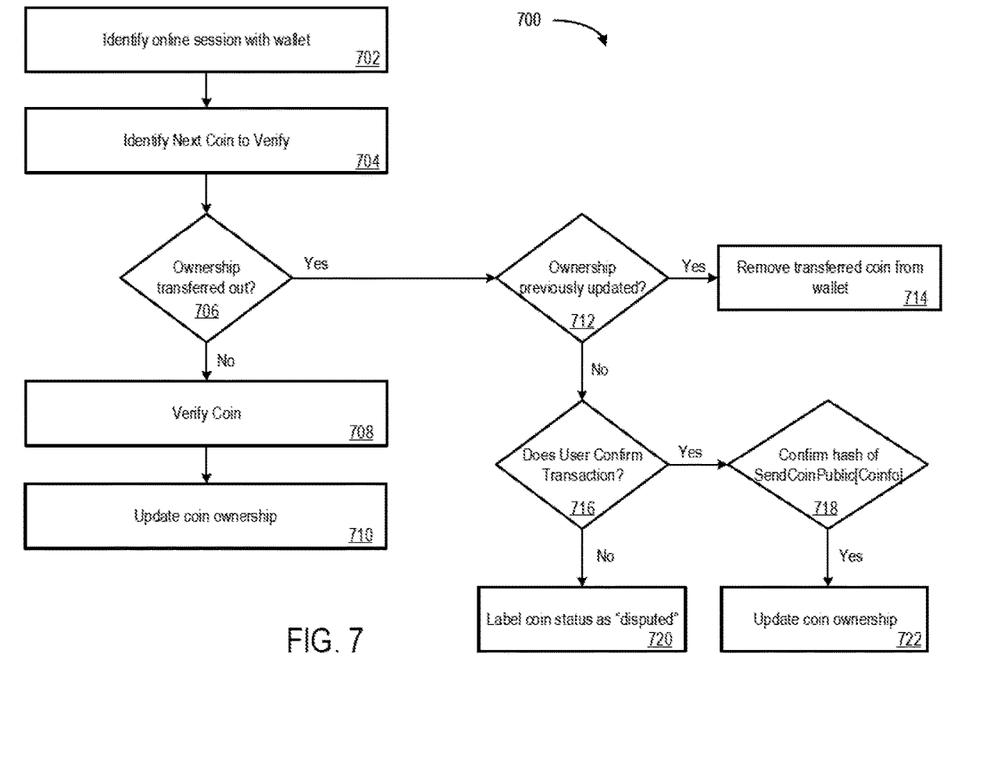
FIG. 7 is a flow diagram of a coin ownership verification process according to some embodiments.

Processing begins at 702 where the coin service provider 140 identifies that it is in an online session with a wallet application 112. Those skilled in the art will appreciate that the coin service provider 140 may undertake a large number of such interactions in parallel (e.g., to verify ownership of coins in a large number of wallet applications substantially at the same time). Processing at 702 may include receiving information about the user (including, for example, a UserID) as well as information about the wallet application. Processing continues at 704 where the coin service provider 140 identifies the next coin to verify in the wallet application 112. Information associated with the next coin is received from the wallet application 112, and the process determines whether the coin had its ownership transferred out of the wallet application 112 (for example, since the last time that the coins in the wallet application 112 were verified, was the coin sold or otherwise conveyed to another user?). If so, processing continues at 712 where a determination is made whether the ownership of that specific coin was previously updated. For example, if the coin was transferred to a seller operating wallet application 122 and that seller performed the process 700 before the buyer did, then processing at 712 will determine that the ownership of the coin was previously updated and the transferred coin will be permanently removed from the wallet application 112 at 714.

If, however, the ownership of the coin that was transferred out has not yet been updated, processing continues at 716 where the user of the user device 110 associated with the wallet application 112 will be prompted to confirm whether the transaction involving the coin had completed successfully. If the user confirms the transaction, processing continues at 718 where the coin service provider 140 performs processing to confirm the hash of SendCoinPublic[CoinInfo]. The hash is confirmed by the coin service provider 140 using the recipient's private PIN (which is stored in the coin service provider 140 user data store 160) to generate a hash of SendCoinPublic[CoinInfo] and to compare it to the hash provided by the recipient of the coin (e.g. the hash received at 520 of FIG. 5). A match confirms that the coin was received by the recipient and the coin ownership has been updated. In this manner, the coin service provider 140 can reliably confirm the ownership transfer of a coin even in the event where the recipient of that coin has been unable to perform any online processing. If, however, the user does not confirm the transaction at 716, processing continues at 720 where the coin status is updated as "disputed". In that situation, if the alleged recipient of the coin does not connect to the coin service provider 140 within a period of time (such as, for example, 30 days from the date of the alleged transaction), the ownership will be set to remain with the original user in the transaction.

If processing at 706 for a specific coin indicates that the coin is not one that was transferred out of the wallet application 112 (but instead is a coin that was transferred into the wallet application 112), processing continues at 708 where the coin is verified. For example, the coin may be verified by the coin service provider 140 performing the verification processing of FIG. 4. Further, the coin service provider 140 may use the passcode (provided from the buyer to the seller as described above in steps 518 and 616 of FIGS. 5 and 6 respectively) to verify the hash. Finally, the coin service provider 140 may verify that the entire payload was actually sent by a user by using the user's PIN to create it to the hash sent at step 514 of the process of FIG. 5. If these verifications succeed, processing continues at 710 where the coin ownership is updated. That is, the coin data store 150 record for that specific coin is updated to reflect the current owner's UserID and the previous owner's UserID. The new owner can then use the coin as set forth herein (e.g., to convey it to another user or to redeem the coin for a fiat currency).

Figure 8:
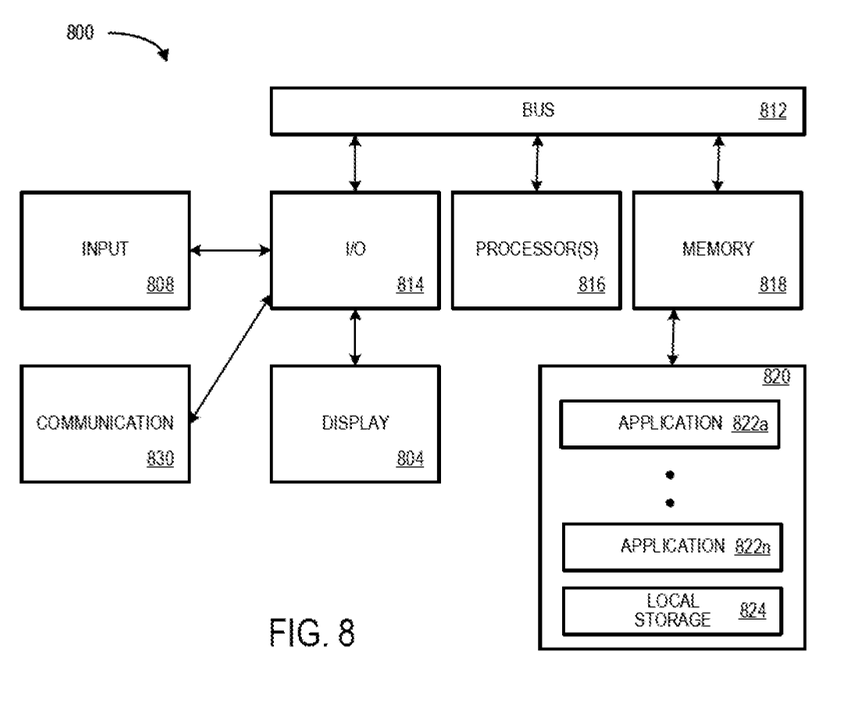
FIG. 8 is a block diagram of an apparatus in accordance with some embodiments of the present invention.

The embodiments described herein may be implemented using any number of different hardware configurations. FIG. 8 illustrates a mobile device 800 that may be used in any of the methods and processes described herein, in accordance with an example embodiment. For example, the mobile device 800 may be operated as either the user device 110 or the user device 120 of FIG. 1.

In some embodiments, device 800 can include some or all of the components described with respect to FIG. 1. The device 800 may be a user device such as the user devices 110 and 120 of FIG. 1. Device 800 has a bus 812 or other electrical components that operatively couple an input/output ("I/O") section 814 with one or more computer processors 816 and memory section 818. I/O section 814 can be connected to a display 804, which can have one or more aspects such as a touch-sensitive component (not shown). In addition, I/O section 814 can be connected with communication unit 830 for receiving application and operating system data, using Wi-Fi, Bluetooth, near field communication (NFC), cellular, and/or other wireless communication techniques (e.g., to allow the device 800 to interact with other user devices to conduct transactions as described herein or to interact with funding service providers 170 and coin service providers 140). Mobile device 800 can include one or more input mechanisms 806 such as a keypad, a button, a touch-screen display, or the like.

Input mechanism 808 is, optionally, a microphone, in some examples. Mobile device 800 optionally includes various sensors (not shown), such as a GPS sensor, accelerometer, directional sensor (e.g., compass), gyroscope, motion sensor, and/or a combination thereof, all of which can be operatively connected to I/O section 814.

Memory section 818 mobile device 800 can include one or more non-transitory computer-readable storage mediums, for storing computer-executable instructions, which, when executed by one or more computer processors 816, for example, can cause the computer processors to perform the techniques described below, including processes 200-700. A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Mobile device 800 is not limited to the components and configuration of FIG. 4 but can include other or additional components in multiple configurations.

Memory section 818 may store one or more applications 822*a-n* including, for example, a wallet application 112, 122 as described herein as well as data (including the wallet data stores 114, 124) and related key information.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium such as the Internet, cloud storage, the Internet of Things (IoT), or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A method for verifying coin ownership comprising:
identifying, by a coin service provider, an online session initiated by a wallet application running on a user device and a next coin to verify;
receiving, by the coin service provider from the wallet application of the user device, information associated with the next coin;
determining, by the coin service provider, that ownership of the next coin was transferred out of the wallet application since the last time coins in the wallet application were verified, and that ownership of the next coin has not been updated in a coin data store;

transmitting, by the coin service provider to the user device, a prompt for the user to confirm that a transaction involving the next coin completed successfully;

receiving, by the coin service provider from the user device, a confirmation message indicating that the transaction involving the next coin completed successfully;

confirming, by the coin service provider, that the next coin was received by a recipient by:
  generating a hash of a public key associated with the user device using a recipient private personal identification number (PIN) stored in a user store;
  comparing the hash of the public key with a hash provided by the recipient of the next coin;
  determining that a match occurred; and
updating, by the coin service provider in the coin data store, ownership information of the next coin.

2. The method of claim 1 wherein identifying the online session comprises at least one of receiving, by the coin service provider from the user device, information about a user and information about the wallet application running on the user device.

3. The method of claim 1, further comprising, after determining that ownership of the next coin was transferred out of wallet application: determining, by the coin service provider, that ownership of the next coin has been updated; and removing, by the coin service provider, the next coin from the wallet application of the user device.

4. The method of claim 1, further comprising, after transmitting the prompt to the user device to confirm that the next coin transaction completed successfully: receiving, by the coin service provider from the user device, a message that the next coin transaction did not complete successfully; and updating, by the coin service provider, the next coin status to disputed in the coin data store.

5. The method of claim 1, further comprising, after transmitting the prompt to the user device to confirm that the next coin transaction completed successfully, failing to receive a completion message from the user device and: updating, by the coin service provider, the next coin status to disputed in the coin data store.

6. The method of claim 5, further comprising: determining, by the coin service provider, that a predetermined time period for receiving the completion message expired; and updating, by the coin service provider, the next coin status in the coin data store to ownership by the wallet application of the user device.

7. The method of claim 1, wherein the updating of the ownership information of the next coin comprises storing a current owner user identifier and a previous owner user identifier in the coin data store.

8. The method of claim 7, wherein the updating the ownership information of the next coin further comprises storing, in the coin data store, at least one pointer which points to user identification data in a user data store of users participating in the coin transaction system.

9. A system for verifying coin ownership comprising:
a coin service provider computer;
a coin data store operably connected to the coin service provider computer;
a user data store operably connected to the coin service provider computer;
a plurality of user devices; and
a network operably connected to the coin service provider computer and to the plurality of user devices;

wherein the coin service provider computer includes computer-executable instructions which when executed cause the coin service provider computer to:
  identify an online session initiated by a wallet application running on a user device and identify a next coin to verify;
  receive information associated with the next coin from the wallet application of the user device;
  determine that ownership of the next coin was transferred out of the wallet application since the last time coins in the wallet application were verified, and that ownership of the next coin has not been updated in the coin data store;
  transmit a prompt to the user device for the user to confirm that a transaction involving the next coin completed successfully;
  receive a confirmation message from the user device indicating that the transaction involving the next coin completed successfully;
  confirm that the next coin was received by a recipient by:
    generating a hash of a public key associated with the user device using a recipient private personal identification number (PIN) stored in the user data store;
    comparing the hash of the public key with a hash provided by the recipient of the next coin;
    determining that a match occurred; and
  update ownership information of the next coin in the coin data store.

10. The system of claim 9 wherein the computer-executable instructions for identifying the online session comprises computer-executable instructions which when executed cause the coin service provider computer to at least one of receive information from the wallet application running on the user device about a user and receive information about the wallet application.

11. The system of claim 9 wherein the coin service provider computer further comprises, after the instructions for determining that ownership of the next coin was transferred out of wallet application, further computer-executable instructions which when executed cause the coin service provider computer to: determine that ownership of the next coin has been updated in the coin data store; and remove the next coin from the wallet application of the user device.

12. The system of claim 9 wherein the coin service provider computer further comprises, after the instructions for transmitting the prompt to the user device to confirm that the next coin transaction completed successfully, further computer-executable instructions which when executed cause the coin service provider computer to: receive a message from the user device that the next coin transaction did not complete successfully; and update the next coin status to disputed in the coin data store.

13. The system of claim 9 wherein the coin service provider computer further comprises, after the instructions for transmitting the prompt to the user device to confirm that the next coin transaction completed successfully and failing to receive a completion message from the user device, further computer-executable instructions which when executed cause the coin service provider computer to update the next coin status to disputed in the coin data store.

14. The system of claim 13 wherein the coin service provider computer comprises further computer-executable instructions which when executed cause the coin service provider computer to: determine that a predetermined time period for receiving the completion message expired; and update the next coin status in the coin data store to ownership by the wallet application of the user device.

15. The system of claim 9, wherein the instructions for updating the ownership information further comprises computer-executable instructions which when executed cause the coin service provider computer to store a current owner user identifier and a previous owner user identifier in the coin data store.

16. The system of claim 15, wherein the instructions for updating the ownership information further comprises computer-executable instructions which when executed cause the coin service provider computer to store at least one pointer in the coin data store which points to user identification data in a user data store of users participating in the coin transaction system.

* * * * *